United States Patent [19]
Rodriguez et al.

[11] 3,862,228
[45] Jan. 21, 1975

[54] AMIDINES
[75] Inventors: Herman Robert Rodriguez, New York, N.Y.; George De Stevens, Summit, N.J.
[73] Assignee: Ciba-Geigy Corporation, Ardsley, N.Y.
[22] Filed: Feb. 18, 1972
[21] Appl. No.: 227,619

Related U.S. Application Data
[63] Continuation-in-part of Ser. No. 10,649, Feb. 11, 1970, abandoned, which is a continuation-in-part of Ser. Nos. 704,517, Feb. 12, 1968, Pat. No. 3,681,340, and Ser. No. 649,828, June 29, 1967, abandoned, said Ser. No. 704,517, and Ser. No. 649,828, each is a continuation-in-part of Ser. No. 630,520, April 13, 1967, abandoned.

[52] U.S. Cl............ 260/564 R, 260/295.5 S, 260/340.5, 260/340.6, 260/340.9, 260/343.7, 260/397.6, 260/470, 260/471 R, 260/501.11, 260/501.12, 260/501.14, 260/516, 260/518 A, 260/519, 260/556 AR, 260/556 B, 260/562 R, 260/562 A; 424/266, 424/278, 424/280, 424/282, 424/309, 424/310, 424/316, 424/317, 424/319, 424/321, 424/324, 424/326
[51] Int. Cl............................ C07c 123/00
[58] Field of Search............ 260/564 R, 556 AR, 260/343.7, 501.11, 501.12, 295.5 S, 260/397.6, 501.14

[56] References Cited
UNITED STATES PATENTS
2,450,386   9/1948   Short et al. ............. 260/564 R
FOREIGN PATENTS OR APPLICATIONS
642,286   8/1950   Great Britain ............. 260/564

OTHER PUBLICATIONS
Chemical Abstr., Vol. 47, Column 11156(e), (Partridge et al.), 1953.

Primary Examiner—Bernard Helfin
Assistant Examiner—Gerald A. Schwartz
Attorney, Agent, or Firm—Joseph G. Kolodny; John J. Maitner; Theodore O. Groeger

[57] ABSTRACT
N-Aralkyl-aryl or aralkylcarboxamidines, e.g., those of the formula

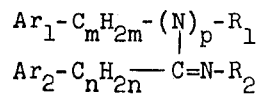

$Ar_{1,2}$ = isocyclic aryl
$R_{1,2}$ = H, alkyl or aralkyl
$m = 1-7$,
$n = 0-4$,
$p = 1$ or $2$
and salts thereof exhibit diuretic and hypoglycemic effects.

6 Claims, No Drawings

AMIDINES

CROSS-REFERENCES TO RELATED APPLICATIONS

This is a continuation-in-part of application Ser. No. 10,649, filed Feb. 11, 1970 now abandoned, which in turn is a continuation-in-part of application Ser. No. 704,517, filed Feb. 12, 1968, now Pat. No. 3,681,340 and of Ser. No. 649,828, filed June 29, 1967 now abandoned, both of which latter are continuations-in-part of application Ser. No. 630,520, filed Apr. 13, 1967, now abandoned.

SUMMARY OF THE INVENTION

The present invention concerns and has for its object the provision of new N-aralkyl-aryl or aralkylcarboxamidines, more particularly of those corresponding to Formula I

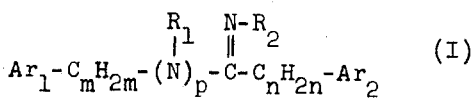

in which each of $Ar_1$ and $Ar_2$ is a monocyclic isocyclic aryl radical $m$ is an integer from 1 to 7, $n$ is an integer from 0 to 4, $p$ is the integer 1 or 2, each of $R_1$ and $R_2$ is hydrogen, lower alkyl or aralkyl or, in case $p$ is 1, $R_1$ also is an amino group, and salts thereof, as well as of corresponding pharmaceutical compositions and of methods for the preparation and application of these product which are useful diuretic and primarily hypoglycemic agents.

DESCRIPTION OF THE PREFERRED EMBODIMENTS

A monocyclic isocyclic aryl radical $Ar_1$ and $Ar_2$ is phenyl or phenyl substituted by one or more than one, preferably up to three, of the same or different substituents attached to any of the positions available for substitution. Such substituents are, for example, lower alkyl, e.g., methyl, ethyl, n- or i-propyl or -butyl, free, etherified or esterified hydroxy, mercapto, or hydroxylower alkyl, such as lower alkoxy, alkylenedioxy, aralkoxy, alkylmercapto, e.g., methoxy, ethoxy, n- or i-propoxy or -butoxy; methylenedioxy, 1,1- or 1,2-ethylenedioxy; benzyloxy; methyl- or ethylmercapto; hydroxymethyl; halogeno, or halogeno-lower alkyl, e.g., fluoro, chloro or bromo; chloromethyl or trifluoromethyl; nitro, amino, di-lower alkylamino or lower alkanoylamino, e.g., dimethylamino or diethylamino; acetylamino or propionylamino; free, esterified or amidated carboxy or sulfo, such as carbo-lower alkoxy, e.g., carbomethoxy or carbethoxy, or di-lower alkylsulfamyl, e.g., dimethylsulfamyl. Preferred radicals $Ar_1$ and $Ar_2$ stand for phenyl, (lower alkyl)$_{1-2}$-phenyl, (hydroxy)-phenyl, (lower alkoxy)$_{1-3}$-phenyl, (lower alkylenedioxy)-phenyl, (lower alkylmercapto)-phenyl, (halogeno)$_{1-2}$-phenyl, (trifluoromethyl)-phenyl, (nitro)-phenyl, (amino)-phenyl, (di-lower alkylamino)-phenyl, (lower alkanoylamino)-phenyl, (carboxy)-phenyl, (carbo-lower alkoxy)-phenyl or (sulfamoyl)-phenyl, and $Ar_1$ also for (lower alkyl or alkoxy)$_{1-2}$-halophenyl, (lower alkyl or alkoxy)$_{1-2}$-nitrophenyl or (lower alkyl or alkoxy)$_{1-2}$-sulfamoylphenyl.

A lower alkyl group $R_1$ and $R_2$ is, for example such mentioned above. An aralkyl group $R_1$ and $R_2$ is preferably unsubstituted or substituted aryl-lower alkyl, e.g., one of the mono-substituted radicals $Ar_1$—$C_mH_{2m}$ mentioned above. An amino group $R_1$ is unsubstituted, mono- or disubstituted by lower alkyl. As used above and hereinafter the term "lower" in connection with hydrocarbon radicals defines such with up to seven, preferably up to four, carbon atoms.

The lower alkylene group $C_mH_{2m}$ represents preferably 1,2-ethylene, but also methylene, 1,1-ethylene, 1,2- or 1,3-propylene, 1,2-, 1,3- 2,3- or 1,4-butylene, 1,2-, 1,3-,2,3- or 2,4-pentylene, 1,2- 1,3-, 1,4-, 2,3-, 2,4or 3,4-hexylene, 2,6- or 3,4-heptylene. The group $C_nH_{2n}$ preferably represents a direct bond but also alkylene with up to four carbon atoms, e.g., such previously mentioned, particularly methylene.

The compounds of the invention exhibit valuable pharmacological properties. Apart from diuretic effects, they show primarily hypoglycemic activity, as can be demonstrated in animal tests, using mammals, for example, mice, rats or dogs as test objects. The compounds of the invention can be administered enterally or parenterally, advantageously orally to the animals, e.g., to dogs at a dose between about 1 and 10 mg/kg/day, or to normal, fasted, water or glucose primed or adrenalectomized rats at a dose between about 10 and 200 mg/kg/day, preferably between about 25 and 75 mg/kg/day, whereupon their urine or orbital blood is collected and analyzed. Accordingly, the compounds of the invention are either valuable hypoglycemic agents, especially in the higher dosage range between about 5 and 50 mg/kg/day, or useful diuretics, advantageously in the lower dosage range between about 1 and 25 mg/kg/day. Both of said activities are desirable due to the fact that several diuretics induce hyperglycemia. Said compounds are also useful intermediates of other valuable products, e.g., those described in the above-mentioned parent applications.

Particularly useful are compounds of the Formula I, in which each of $Ar_1$ and $Ar_2$ is phenyl, (lower alkyl)$_{1-2}$-phenyl, (hydroxy)-phenyl, (lower alkoxy)$_{1-3}$-phenyl, (lower alkylenedioxy)-phenyl, (lower alkylmercapto)-phenyl, (halogeno)$_{1-2}$-phenyl, (trifluoromethyl)-phenyl, (nitro)-phenyl, (amino)-phenyl, (di-lower alkylamino)-phenyl, (lower alkanoylamino)-phenyl, (carboxy)-phenyl, (carbo-lower alkoxy)-phenyl or (sulfamoyl)-phenyl, $Ar_1$ also is (lower alkyl or alkoxy)$_{1-2}$-halophenyl, (lower alkyl or alkoxy)$_{1-2}$-nitrophenyl or (lower alkyl or alkoxy)$_{1-2}$-sulfamoylphenyl, $m$ is an integer from 1 to 7, $n$ is an integer from 0 to 4, $p$ is the integer 1 or 2, each of $R_1$ and $R_2$ is hydrogen or lower alkyl and, in case $p$ is 1, $R_1$ also is amino, lower alkylamino or di-lower alkylamino, or therapeutically useful acid addition salts thereof.

Preferred compounds are those of Formula II

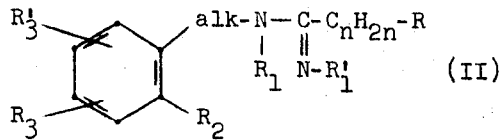

wherein R is phenyl, (lower alkyl)$_{1-2}$-phenyl, (hydroxy)-phenyl, (lower alkoxy)$_{1-3}$-phenyl, (halogeno)$_{1-2}$-phenyl, (trifluoromethyl)-phenyl, (nitro)-phenyl, (di-lower alkylamino)-phenyl, (carboxy)-phenyl or (carbo-lower alkoxy)-phenyl, $n$ is the integer 0 or 1, each of $R_1$ and $R_1'$ is hydrogen or lower alkyl, $R_2$ is hydrogen, lower alkoxy, halogeno, nitro or sulfamoyl, each of $R_3$ and $R_3'$ is hydrogen, lower alkyl or lower alkoxy, and alk is lower alkylene separating the benzene nucleus from the nitrogen atom by one to three carbon atoms, or therapeutically useful acid addition salts thereof, i.e., salts of pharmaceutically acceptable acids.

Compounds that are especially valuable are those of Formula III

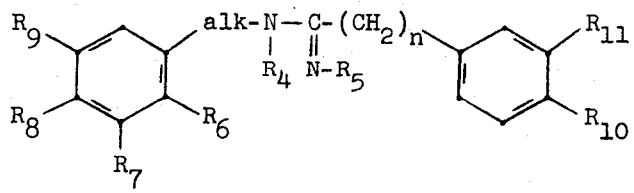

(III)

in which each of $R_4$ and $R_5$ is hydrogen or methyl, alk is alkylene with two to four carbon atoms separating the benzene nucleus from the nitrogen atom by two carbon atoms, $n$ is the integer 0 or 1, $R_6$ is hydrogen, methoxy, chloro, nitro or sulfamoyl, one of $R_7$, $R_8$ and $R_9$ is hydrogen and the others, as well as $R_{10}$ and $R_{11}$ are hydrogen, methyl, ethyl, isopropyl, methoxy, ethoxy or isobutoxy, or each of $R_{10}$ and $R_{11}$ are also hydroxy, chloro, trifluoromethyl, nitro, amino or carboxy, or therapeutically useful acid addition salts thereof.

Most important are those compounds of Formula III in which each of $R_4$, $R_5$ and $R_7$ is hydrogen, alk is 1,2-ethylene, 1,2-propylene or 1,2-butylene, n is the integer 0, $R_6$ is hydrogen, methoxy, chloro, nitro or sulfamoyl, each of $R_8$ and $R_9$ is methoxy and each of $R_{10}$ and $R_{11}$ is hydrogen, methyl or chloro, or therapeutically useful acid addition salts thereof which, when given at oral doses between about 1 and 50 mg/kg/day to normal, fasted, glucose primed or adrenalectomized rats, show outstanding diuretic and hypoglycemic effects.

The compounds of the invention are prepared according to methods in themselves known, for example, the corresponding process consists in a. condensing a reactive functional derivative of an aryl- or aralkylcarboxylic acid with a primary or secondary aralkylamine, preferably compounds of the formulae $$Ar_1—C_mH_{2m}—X + Y—C_nH_{2n}—Ar_2$$

in which X stands for

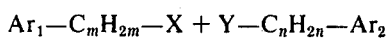

and Y for a reactively converted, nitrogen containing carboxyl group or X for reactively esterified hydroxy or mercapto and Y for

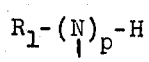

or b. reacting an N-aralkyl derivative of a nitrogen containing, reactive functional derivative of an aryl- or aralkylcarboxylic acid with an amine, preferably compounds of the formulae

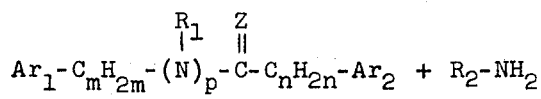

in which Z stands for oxo or thio, or a reactive functional derivative thereof, e.g., a corresponding imide halide, and converting any resulting compound into a compound of the invention.

A reactively esterified hydroxy group is, for example, such derived from hydrohalic or sulfonic acids, e.g., hydrochloric, hydrobromic, hydriodic, methane-, ethane- or p-toluenesulfonic acid, whereas a corresponding etherified hydroxy or mercapto group preferably is such, derived from lower alkanols or cyano-alkanols. A reactive functional derivative of the carboxylic acid used in reaction (a) is, for example, its imido ester, imido thioester, unsubstituted amidine or nitrile.

Any compound so-obtained, containing in the aromatic portion a substituent convertible into such specifically mentioned above, e.g., an azo group, such group may be converted into amino, for example by hydrogenation, advantageously in an acidic medium. Also the compounds of the invention may be converted into each other by known methods. Thus, for example, resulting compounds containing free hydroxy, mercapto or amino groups, may be etherified, esterified or N-substituted, for example with the use of reactive esters of corresponding alcohols derived, for example, from the acids mentioned above, or with reactive functional acid derivatives, e.g., the halides or anhydrides. Resulting nitro compounds may be reduced as shown for the azo compounds and acylamino compounds hydrolyzed.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g., hydrochloric or hydrobromic acid, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, aminobenzoic, anthranilic, 4-hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic or sulfanilic acid; methionine, tryptophan, lysine or arginine.

These or other salts, for example, the picrates, can also be used for the purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, amines, alcohols or phenols may be used in the form of the alkali or alkaline earth metal salts, e.g., sodium potassium, magnesium, halomagnesium or clacium salts, and the nitrogen containing acid derivatives, e.g., imidic acid esters, in the form of their acid addition salts. Mainly, those starting materials should be used in the above reactions that lead to the formation of those compounds indicated as being specially valuable.

The starting material used is known or, if new, may be prepared according to known methods, e.g., the classical amination or amidation reactions, described, for example, by R. B. Wagner and H. D. Zook in "Synthetic Organic Chemistry" John Wiley & Sons, Inc., New York, 1956, or according to the following new nitration method, which is a further object of the present invention.

The new method for the preparation of o-nitro-aralkanes containing in the alkyl chain a group capable of forming a nitrate, such as a basic nitrogen containing group, e.g., prim., sec. or tert. amino, hydrazino, imino or hydrazono, free or etherified hydroxyamino or oximino, amidino, guanidino and the like, the corresponding quaternary and/or hydrogenated forms, which process consists in subjecting a nitrate of an ortho-unsubstituted aralkane containing in the alkyl chain said group capable of forming a nitrate, to pyrolysis, advantageously under acidic conditions.

Accordingly, starting material used in the process of the invention can be prepared by subjecting a compound of the formula

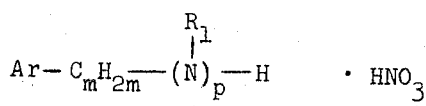

in which Ar is an isocyclic aryl radical, e.g., such mentioned above, containing in at least one of the ortho positions a hydrogen atom, to acidic conditions and/or an elevated temperature. Generally any relatively strong acid may be used, hydrochloric and trifluoroacetic acid are particularly useful. The temperature range for this reaction is about 0° to 200°, preferably about 20° to 100°.

Starting materials or final products that are mixtures of isomers can be separated into single isomers by methods in themselves known. For example, compounds that contain one or more asymmetrical carbon atoms may be in the form of racemate mixtures, pure racemates or optical antipodes. Mixtures of racemates, by virtue of the physicochemical differences between the components, can be resolved into pure racemates, for example, by chromatography and/or fractional crystallization. Racemic products can likewise be resolved into the optical antipodes, for example, by reaction with optically active acids, separation of the diastereomeric salts and liberation of the bases from the salts.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g., lactose, dextrose, sucrose, mannitol, sorbitol, cellulose and/or glycine, (b) lubricants, e.g., silica, talcum, stearic acid, its magnesium or calcium salt and/or polyethyleneglycol, for tablets also (c) binders, e.g., mangesium aluminum silicate, starch paste, gelatin, tragacanth, methylcellulose, sodium carboxymethylcellulose and/or polyvinylpyrrolidone, if desired, (d) disintegrants, e.g., starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75 percent, preferably about 1 to 50 percent, of the active ingredient.

The following examples are intended to illustrate the invention and are not to be construed as being limitations thereon. Temperatures are given in degrees Centigrade, and all parts wherever given are parts by weight.

EXAMPLE 1

To the solution of 25 g 2-(2-nitro-4,5-dimethoxyphenyl)-ethylamine in 500 ml dimethylformamide, 22.5 g 4-methyl-benzimidic acid ethyl ester hydrochloride are added and the mixture heated overnight to 80° while stirring. It is then evaporated, the residue triturated with acetone and diethyl ether and recrystallized from methanol-ethanol to yield the N-[2-(2-nitro-4,5-dimethoxy-phenyl)-ethyl]-4-methyl-benzamidine hydrochloride of the formula

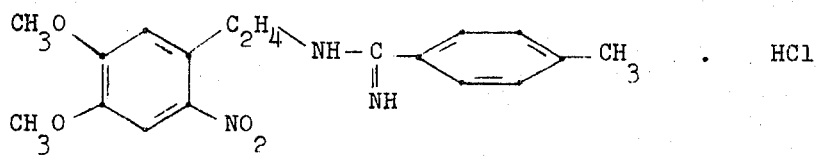

melting at 223°–225°.

The starting material is prepared as follows: The solution of 190 g 2-(3,4-dimethoxy-phenyl)-ethylamine in 2 liters isopropanol is neutralized by the dropwise addition of concentrated nitric acid while stirring and cooling in an ice bath. The precipitate formed is filtered off, washed with isopropanol and diethyl ether and dried to yield the corresponding nitrate melting at 152°–154° (dec.).

240 g thereof are added portionwise to 1 liter trifluoroacetic acid while stirring, whereby the temperature is allowed to rise to about 70°. Hereupon the mixture is evaporated in vacuo, tje residue dissolved in 1.5 liter ethyl acetate and the solution acidified with saturated hydrogen chloride in ethyl acetate. The precipitate formed is filtered off, washed with ethyl acetate and diethyl ether and recrystallized from ethanol, to yield the 2-(2-nitro-4,5-dimethoxy-phenyl)-ethylamine hydrochloride melting at 240°. It is dissolved in the minimum amount of water, the solution made strongly basic with aqueous potassium hydroxide, the mixture extracted with chloroform, the extract dried, filtered and evaporated to yield the corresponding base which melts, after recrystallization from diethyl ether, at 104°–108°.

In the analogous manner, the following new starting materials are prepared:
  a. 2-(2-nitro-4,5-diethoxy-phenyl)-ethylamine hydrochloride, m.p. 222°–224°.
  b. 3-(2-nitro-4,5-dimethoxy-phenyl)-propylamine hydrochloride, m.p. 194°–197°.

EXAMPLE 2

To the solution of 10 g 2-(3,4-dimethoxy-phenyl)-ethylamine in 500 ml tetrahydrofuran, 9.3 g N-methyl-4-methyl-benzimidoyl chloride are added dropwise while stirring and the mixture is heated at the steam bath for one-half an hour. It is cooled, the precipitate formed filtered off, washed with tetrahydrofuran and recrystallized from ethanol-isopropanol to yield the N-methyl-N'-[2-(3,4-dimethoxy-phenyl)-ethyl]-4-methyl-benzamidine hydrochloride of the formula

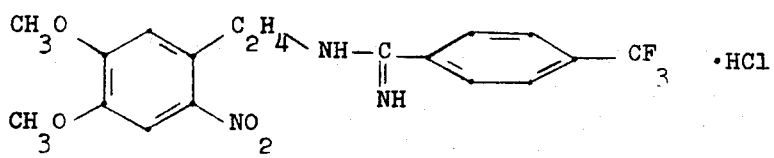

melting at 188°–193°.

EXAMPLE 3

To the solution of 10.0 g 2-(2-nitro-4,5-dimethoxy-phenyl)-ethylamine in 100 ml ethanol, 11.2 g 4-trifluoromethyl-benzimidic acid ethyl ester hydrochloride are added and the whole is stirred and refluxed for 16 hours. The mixture is evaporated in vacuo, the residue triturated with ethyl acetate and recrystallized from ethanol to yield the N-[2-(2-nitro-4,5-dimethoxy-phenyl)-ethyl]-4-trifluoromethyl-benzamidine hydrochloride of the formula

melting at 200°–202°.

The new starting material is prepared as follows: To the solution of 150 g 4-trifluoromethyl-benzonitrile in 700 ml anhydrous diethyl ether, 75 ml anhydrous ethanol are added and dry hydrogen chloride is bubbled through the stirred mixture at 0° until saturation is reached. Upon addition of diethyl ether to a small sample, some crystals are obtained, which are used to seed the main batch; the latter is allowed to stand overnight in the refrigerator. The precipitate formed is filtered off and washed with diethyl ether to yield the 4-trifluoromethyl-benzimidic acid ethyl ester hydrochloride melting at 128°.

In the analogous manner, the following new starting materials are prepared:
  a. 4-ethyl-benzimidic acid ethyl ester hydrochloride, m.p. 113°–114°.
  b. 4-isopropyl-benzimidic acid ethyl ester hydrochloride, m.p. 110°–111°.
  c. 4-tolyl-acetimidic acid ethyl ester hydrochloride, m.p. 133°.

EXAMPLE 4

To the solution of 3.1 g 2-(2-nitro-4,5-diisobutoxy-phenyl)-ethylamine in 100 ml dimethylformamide, 2.1 g 4-methyl-benzimidic acid ethyl ester hydrochloride are added and the mixture stirred overnight at 80°. It is then evaporated in vacuo, the residue triturated with acetone and diethyl ether and recrystallized from ethanol, to yield the N-[2-(2-nitro-4,5-diisobutoxy-phenyl)-ethyl]-4-methylbenzamidine hydrochloride of the formula

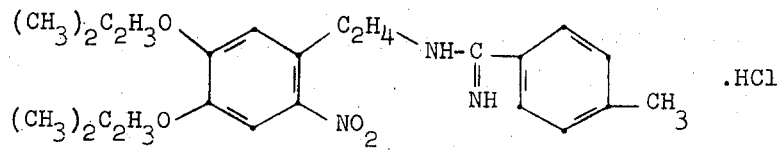

showing in the I.R. spectrum, inter alia bands at 1,612 and 1,668 cm$^{-1}$.

The starting material is prepared as follows: To the mixture of 38 g of a 50 percent sodium hydride suspension in mineral oil and 200 ml dimethylsulfoxide, the solution of 55.2 g 3,4-dihydroxy-benzaldehyde in 400 ml dimethylsulfoxide is added dropwise while cooling and stirring. The mixture is then heated on the steam bath and 120 g isobutyl bromide are added dropwise while stirring, and stirring is continued overnight at the steam bath. After cooling, the mixture is diluted with water, extracted with diethyl ether, the extract washed with 10 percent aqueous sodium hydroxide and water, dried, filtered and evaporated. The residue is distilled and the fraction boiling at 149°–155°/0.06–0.07 mm Hg collected. It solidifies on standing and is recrystallized from hexane to yield the 3,4-diisobutoxy-benzaldehyde melting at 40°–42°.

The mixture of 48 g thereof, 15 g ammonium acetate, 16 ml nitromethane and 150 ml acetic acid is refluxed for 2 hours. After cooling the precipitate formed is filtered off and washed with acetic acid and water to yield the β-nitro-3,4-diisobutoxy-styrene, melting at 122°–124°.

The solution of 40 g thereof in 500 ml tetrahydrofuran is added dropwise to the mixture of 16 g lithium aluminumhydride in 300 ml diethyl ether while stirring.

Hereupon the mixture is stirred for an additional hour and the excess reducing agent decomposed with water. The mixture is filtered, the residue washed with tetrahydrofuran and the filtrate evaporated to yield the 2-(3,4-diisobutoxy-phenyl)-ethylamine as an oil.

The solution of 38 g thereof in 200 ml ethanol is neutralized by the dropwise addition of concentrated nitric acid. It is then evaporated, the residue dissolved in the minimum amount of diethyl ether and upon stirring in the cold a precipitate separates, which is filtered off and dissolved in 100 ml trifluoroacetic acid. The solution is heated on the steam bath for 15 minutes, then evaporated and the residue triturated with diethyl ether to yield the 2-(2-nitro-4,5-diisobutoxy-phenyl)-ethylamine trifluoroacetate, melting at 170°–172°. It is dissolved in the minimum amount of water, the solution made basic with aqueous sodium hydroxide, extracted with tetrahydrofuran and the extract evaporated to yield the corresponding free base.

EXAMPLE 5

The mixture of 80 g 2-(2-nitro-4,5-dimethoxy-phenyl)-ethylamine, 66 g benzimidic acid ethyl ester hydrochloride and 750 ml methanol is refluxed for 3 hours, then concentrated to 250 ml and the concentrate diluted with 1.5 liter diethyl ether. The yellow precipitate formed is filtered off and washed with diethyl ether to yield the N-[2-(2-nitro-4,5-dimethoxy-phenyl)-ethyl]-benzamidine hydrochloride melting at 235°–239°.

85 g thereof are dissolved in 1 liter methanol and hydrogenated at an initial pressure of 40 p.s.i. over 2 g platinum oxide at room temperature. After consumption of the theoretical amount of hydrogen, the mixture is filtered, the filtrate acidified with ethanolic hydrochloric acid, the solution combined with the equal volume of diethyl ether and the precipitate formed filtered off: it represents the N-[2-(2-amino-4,5-dimethoxy-phenyl)-ethyl]-benzamidine dihydrochloride of the formula

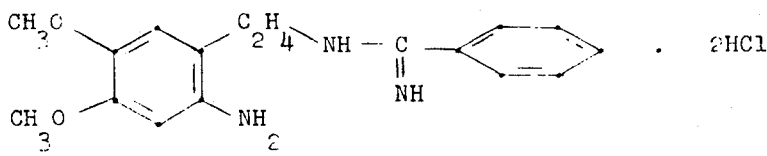

melting at 274°.

EXAMPLE 6

To the solution of 15 g 2-(2-nitro-4,5-dimethoxy-phenyl)-ethylamine in 100 ml methanol, 13 g phenylacetimidic acid ethyl ester hydrochloride are added and the mixture is refluxed for 5 hours. It is cooled and the precipitate formed filtered off to yield the N-[2-(2-nitro-4,5-dimethoxy-phenyl)-ethyl]-phenylacetamidine hydrochloride of the formula

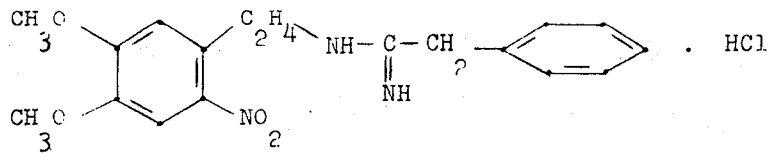

melting at 220°–222°.

EXAMPLE 7

The mixture of 5.0 g N-methyl-2-(2-nitro-4,5-dimethoxy-phenyl)-ethylamine, 3.9 g ethyl benzimidate hydrochloride and 25 ml ethanol is refluxed for 17 hours. It is then evaporated, the residue triturated with ethylacetate and then with chloroform to yield, after filtration, the N-methyl-N-[2-(2-nitro-4,5-dimethoxy-phenyl)-ethyl]-benzamidine hydrochloride of the formula

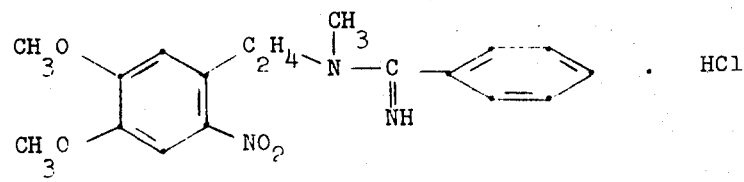

melting at 218°–219°.

EXAMPLE 8

In the manner described in the previous Examples, the following compounds of Formula III are prepared from equivalent amounts of the corresponding starting materials; $R_4=R_5=H$:

| No. | $R_6$ | $R_7$ | $R_8 + R_9$ | | $R_{10}$ | $R_{11}$ | m | n | Salt | m.p.°C | Recr.from |
|---|---|---|---|---|---|---|---|---|---|---|---|
| 1 | H | H | H | H | H | H | 2 | 0 | HCl | 164–170 | i—$C_3H_7OH$ |
| 2 | H | H | H | H | $CH_3$ | H | 2 | 0 | HCl | 259–261 | $C_2H_5OH$ |
| 3 | H | H | $OCH_3$ | H | $CH_3$ | H | 2 | 0 | HCl | 229–232 | i—$C_3H_7OH$ |
| 4 | H | $OCH_3$ | H | H | $CH_3$ | H | 2 | 0 | HCl | 192–195 | i—$C_3H_7OH$ |
| 5 | H | $CH_3$ | $CH_3$ | H | $CH_3$ | H | 2 | 0 | HCl | 249–252 | $C_2H_5OH$ |
| 6 | H | $OCH_3$ | $OCH_3$ | H | H | H | 2 | 0 | HCl | 198–200 | $C_2H_5OH$ |
| 7 | H | $OCH_3$ | $OCH_3$ | H | $CH_3$ | H | 1 | 0 | HCl | 136–140 | $C_2H_5OH$ |
| 8 | H | $OCH_3$ | $OCH_3$ | H | $CH_3$ | H | 2 | 0 | HCl | 209–210 | $C_2H_5OH$ |
| 9 | H | $OCH_3$ | $OCH_3$ | H | $CH_3$ | H | 3 | 0 | HCl | 204–206 | $C_2H_5OH$ |
| 10 | H | $OCH_3$ | $OCH_3$ | H | $CH_3$ | H | 1 | 1 | HCl | 164–166 | i—$C_3H_7OH$ |
| 11 | H | $OCH_3$ | $OCH_3$ | H | $C_2H_5$ | H | 2 | 0 | HCl | 212–214 | $C_2H_5OH$ |
| 12 | H | $OCH_3$ | $OCH_3$ | H | i—$C_3H_7$ | H | 2 | 0 | HCl | 179–180 | i—$C_3H_7OH$ |
| 13 | H | $OCH_3$ | $OCH_3$ | H | $NO_2$ | H | 2 | 0 | HCl | 227–229 | i—$C_3H_7OH$ |
| 14 | H | $OCH_3$ | $OCH_3$ | H | $NH_2$ | H | 2 | 0 | 2HCl | 230–233 | i—$C_3H_7OH$ |
| 15 | H | $OC_2H_5$ | $OC_2H_5$ | H | $CH_3$ | H | 2 | 0 | HCl | 205–206 | $C_2H_5OH$ |
| 16 | H | H | O—$CH_2$—O | | $CH_3$ | H | 2 | 0 | HCl | 245–248 | $C_2H_5OH$ |
| 17 | $OCH_3$ | $OCH_3$ | H | H | $CH_3$ | H | 2 | 0 | HCl | 194–195 | i—$C_3H_7OH$ |
| 18 | $OCH_3$ | H | $OCH_3$ | H | $CH_3$ | H | 2 | 0 | HCl | 176–178 | i—$C_3H_7OH$ |
| 19 | $OCH_3$ | H | H | $OCH_3$ | $CH_3$ | H | 2 | 0 | HCl | 191–195 | i—$C_3H_7OH$ |
| 20 | H | Cl | Cl | H | $CH_3$ | H | 2 | 0 | HCl | 265–268 | $C_2H_5OH$ |
| 21 | Cl | H | $OCH_3$ | $OCH_3$ | $CH_3$ | H | 2 | 0 | HCl | 237–239 | $C_2H_5OH$ |
| 22 | $OCH_3$ | H | $OCH_3$ | $OCH_3$ | $CH_3$ | H | 2 | 0 | HCl | 218–220 | i—$C_3H_7OH$ |
| 23 | $NO_2$ | H | $OCH_3$ | $OCH_3$ | H | H | 2 | 0 | HCl | 241–243 | $CH_3OH$ |
| 24 | $NH_2$ | H | $OCH_3$ | $OCH_3$ | H | H | 2 | 0 | 2HCl | 276–278 | $C_2H_5OH$ |
| 25 | $NH_2$ | H | $OCH_3$ | $OCH_3$ | $CH_3$ | H | 2 | 0 | 2HCl | 285–287 | $CH_3OH$ |
| 26 | $NO_2$ | H | $OCH_3$ | $OCH_3$ | H | $CH_3$ | 2 | 0 | HCl | 207–211 | i—$C_3H_7OH$ |
| 27 | $NO_2$ | H | $OCH_3$ | $OCH_3$ | $CH_3$ | $CH_3$ | 2 | 0 | HCl | 236–238 | i—$C_3H_7OH$ |
| 28 | $NO_2$ | H | $OCH_3$ | $OCH_3$ | $OCH_3$ | H | 2 | 0 | HCl | 200 | $C_2H_5OH$ |
| 29 | $NH_2$ | H | $OCH_3$ | $OCH_3$ | $OCH_3$ | H | 2 | 0 | 2HCl | 281–283 | $CH_3OH$ |
| 30 | $NO_2$ | H | $OCH_3$ | $OCH_3$ | Cl | H | 2 | 0 | HCl | 235–239 | $C_2H_5OH$ |
| 31 | $NO_2$ | H | $OCH_3$ | $OCH_3$ | $CH_3$ | H | 3 | 0 | HCl | 200–203 | i—$C_3H_7OH$ |
| 32 | $NO_2$ | H | $OCH_3$ | $OCH_3$ | $CH_3$ | H | 2 | 1 | HCl | 219–220 | $CH_3OH$ |
| 33 | $NO_2$ | H | $OCH_3$ | $OCH_3$ | i—$C_3H_7$ | H | 2 | 0 | HCl | 197–199 | $CH_3CN$ |
| 34 | $NO_2$ | H | $OCH_3$ | $OCH_3$ | COOH | H | 2 | 0 | HCl | 254–255 | i—$C_3H_7OH$ |
| 35 | $NO_2$ | H | $OC_2H_5$ | $OC_2H_5$ | $CH_3$ | H | 2 | 0 | HCl | 210–212 | $C_2H_5OH$ |
| 36 | H | $OCH_3$ | $OCH_3$ | $OCH_3$ | $CH_3$ | H | 2 | 0 | HCl | 229–232 | i—$C_3H_7OH$ |

EXAMPLE 9

Preparation of 1,000 tablets each containing 500 mg of the active ingredient:

Formula:

| | |
|---|---|
| N-[2-(2-nitro-4,5-dimethoxy-phenyl)-ethyl]-4-methyl-benzamidine hydrochloride | 500.0 g |
| Wheat starch | 96.8 g |
| Magnesium aluminum silicate | 20.0 g |
| Methylcellulose | 13.3 g |
| Stearic acid | 13.3 g |
| Colloidal silica | 6.6 g |
| Anhydrous ethanol | q.s. |
| Purified water | q.s. |

Procedure

All powders with the exception of the silica and starch are passed through a screen having an opening of 0.6 mm and mixed well. From the starch and 65 ml water a paste is formed which is used to granulate the powders together with the ethanol. The wet granulate is passed through a screen with 2 mm openings and dried overnight at 35°. The dry granulate is broken in a hammer mill, passed through a screen with 1.2 mm openings and compressed into tablets each weighing 0.65 g, using concave punches with 12 mm diameter, uppers bisected.

EXAMPLE 10

Preparation of 10,000 tablets each containing 50.0 mg of the active ingredient:

Formula:

| | |
|---|---|
| N-methyl-N'-[2-(3,4-dimethoxy-phenyl)-ethyl]-4-methyl-benzamidine hydrochloride | 500.00 g |
| Lactose | 1,706.00 g |
| Corn starch | 90.00 g |
| Polyethylene glycol 6,000 | 90.00 g |
| Talcum powder | 90.00 g |
| Magnesium stearate | 24.00 g |
| Purified water | q.s. |

Procedure

All the powders are passed through a screen with an opening of 0.6 mm. Then the drug substance, lactose, talcum, magnesium stearate and half of the starch are mixed in a suitable mixer. The other half of the starch is suspended in 45 ml water and the suspension added to the boiling solution of the polyethylene glycol in 180 ml water. The paste formed is added to the powders which are granulated, if necessary, with an additional amount of water. The granulate is dried overnight at 35°, broken on a screen with 1.2 mm openings and compressed into tablets using concave punches with 7.1 mm diameter, uppers bisected.

EXAMPLE 11

Into the solution of 10.0 g N-[2-(2-nitro-4,5-dimethoxy-phenyl)-ethyl]-4-methyl-benzimidoyl chloride in 250 ml tetrahydrofuran, ammonia is bubbled in while stirring and keeping the temperature at 0°. After the mixture turns basic, the precipitate formed is filtered off, dissolved in the minimum amount of ethanol, the solution acidified with ethanolic hydrochloric acid, the precipitate formed filtered off and recrystallized from methanol-ethanol to yield the N-[2-(2-nitro-4,5-dimethoxy-phenyl)-ethyl]4-methyl-benzamidine hydrochloride, melting at 223°–225°; it is identical with the compound obtained according to Example 1.

The starting material is prepared as follows: To the solution of 14.2 g 2-(2-nitro-4,5-dimethoxy-phenyl)-ethylamine in 250 ml tetrahydrofuran, cooled to 0°, the solution of 5.0 g 4-toluyl chloride in 250 ml tetrahydrofuran is added dropwise while stirring. The precipitate formed is filtered off, the filtrate evaporated in vacuo, the residue triturated with ethyl acetate and recrystallized from ethanol to yield the N-[2-(2-nitro-4,5-dimethoxy-phenyl)-ethyl]-4-methyl-benzamide, melting at 169°–171°.

The mixture of 10.0 g thereof and 50 ml phosphorus oxychloride is refluxed for 5 hours and evaporated in vacuo. The resulting imidoyl chloride is used as such without further purification.

EXAMPLE 12

To the solution of 10 g 2-(2-nitro-4,5-dimethoxyphenyl)-ethylamine in 500 ml tetrahydrofuran, 10 g N-methyl-4-methyl-benzimidoyl chloride in 120 ml tetrahydrofuran are added dropwise while stirring at room temperature. After 30 minutes, the mixture is filtered, the filtrate cooled overnight in the refrigerator, the precipitate formed filtered off and recrystallized from acetonitrile, to yield the N-methyl-N'-]2-(2-nitro-4,5-dimethoxyphenyl)-ethyl]-4-methyl-benzamidine hydrochloride of the formula

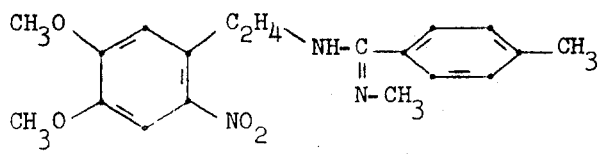

melting at 198°–200°.

EXAMPLE 13

The mixture of 8.4 g 1-(3,4-dimethoxyphenyl)-2-amino-n-butane, 6 g 4-chlorobenzamidine and 400 ml toluene is refluxed for four days and evaporated. The residue is taken up in the minimum amount of ethyl acetate, the solution acidified with hydrogen chloride in ethyl acetate, the precipitate formed filtered off and recrystallized from methanol-acetonitrile, to yield the N-[1-(3,4-dimethoxyphenyl)-2-n-butyl]-4-chloro-benzamidine hydrochloride of the formula

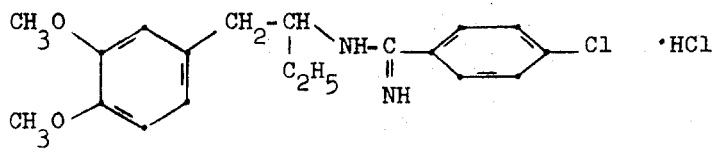

melting at 192°–197°.

The starting material is prepared as follows: Through the solution of 10 g 4-chloro-benzonitrile in 50 ml diethyl ether and 5 ml anhydrous ethanol, hydrogen chloride is bubbled while stirring at 0°. After standing overnight at room temperature, the mixture is evaporated in vacuo, to yield the 4-chloro-benzimidic acid ethyl ester hydrochloride.

Through the solution of 10 g thereof in 125 ml methanol, ammonia is bubbled for 30 minutes while cooling in an ice bath. The mixture is evaporated in vacuo, the residue dissolved in the minimum amount of water, the solution made basic with saturated aqueous potassium hydroxide and extracted with chloroform. The extract is dried, filtered, evaporated and the residue recrystallized from benzene, to yield the 4-chloro-benzimidine melting at 160°–165°.

In the analogous manner, the following compounds are prepared:
a. N-[1-(3,4-dimethoxyphenyl)-2-n-propyl]-4-methyl-benzamidine hydrochloride, m.p. 218°–220° (acetonitrile);
b. N-[1-(3,4-dimethoxyphenyl)-2-n-butyl]-4-methyl-benzamidine hydrochloride, m.p. 168°–173° (acetonitrile);
c. N-[1-(3,4-dimethoxyphenyl)-2-n-butyl]-benzamidine hydrochloride, m.p. 138°–142° (methanol-acetonitrile);
d. N-[1-(2-nitro-4,5-dimethoxyphenyl)-2-n-butyl]-4-methyl-benzamidine hydrochloride, m.p. 148°–152° (toluene);
e. N-[2-(2-nitro-4,5-dimethoxyphenyl)-n-propyl]-4-methyl-benzamidine hydrochloride, m.p. 135°–138° (methanol-acetonitrile);
f. N-[2-(3,4-dimethoxyphenyl)-n-butyl]-4-methyl-benzamidine hydrochloride, m.p. 185°–188° (methanol-acetonitrile).

EXAMPLE 14

The mixture of 18 g N[3,4-dimethoxyphenyl)-ethyl]-4-methyl-benzamidine hydrochloride, 6 g chlorosulfonic acid and 500 ml trifluoroacetic acid is refluxed for 3 hours and allowed to stand overnight at room temperature. It is poured into 1 liter methanol, the solution evaporated, the residue triturated with diethyl ether and hot water, recrystallized from acetonitrile and again from water, to yield the N-[2-(2-sulfo-4,5-dimethoxyphenyl)-ethyl]-4-methyl-benzamidine dihydrate of the formula

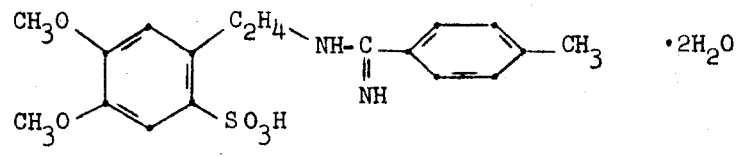

melting at 240°–243°.

EXAMPLE 15

According to the method described in the previous examples, the following compounds of Formula III are prepared from equivalent amounts of the corresponding starting materials: $R_4=R_5=R_{11}=H$, $m=2$, $n=0$

| No. | $R_6$ | $R_7$ | $R_8$ | $R_9$ | $R_{10}$ | Salt | m.p. °C | Recr. from |
| --- | --- | --- | --- | --- | --- | --- | --- | --- |
| 1 | $NO_2$ | H | OH | $OCH_3$ | $CH_3$ | HCl | 215–218 | $CH_3OH$—$CH_3CN$ |
| 2 | $NO_2$ | H | $OCH_3$ | OH | $CH_3$ | HCl | 222–224 | i-$C_3H_7OH$—$CH_3COOet$ |
| 3 | H | $NO_2$ | $OCH_3$ | H | $CH_3$ | HCl | 210–212 | $CH_3OH$—$CH_3CN$ |
| 4 | $NO_2$ | $OCH_3$ | H | $OCH_3$ | $CH_3$ | HCl | 258–259 | do. |
| 5 | $NO_2$ | H | benzyl-oxy | $OCH_3$ | $CH_3$ | HCl | 237–240 | $C_2H_5OH$ |
| 6 | $NO_2$ | H | $OCH_3$ | benzyl-oxy | $CH_3$ | HCl | 226–229 | do. |
| 7 | $NO_2$ | H | $OCH_3$ | $OCH_3$ | $CH_2OH$ | HCl | 225–228 | $CH_3OH$—$CH_3CN$ |
| 8 | $NO_2$ | H | $OCH_3$ | $OCH_3$ | $CH_2Cl$ | HCl | 213–216 | do. |

EXAMPLE 16

The mixture of 8.6 g of 1-(3,4-dimethoxyphenyl)-2-amino-n-butane, 6.7 g of 4-methylbenzamidine and 300 ml of toluene is refluxed for 4½ days and evaporated. The residue is taken up in the minimum amount of ethyl acetate, the solution acidified with hydrogen chloride in ethyl acetate, the precipitate formed triturated with 30 ml of 2-butanone and recrystallized from acetonitrile, to yield the N-[1-(3,4-dimethoxyphenyl)-2-n-butyl]-4-methylbenzamidine hydrochloride of the formula

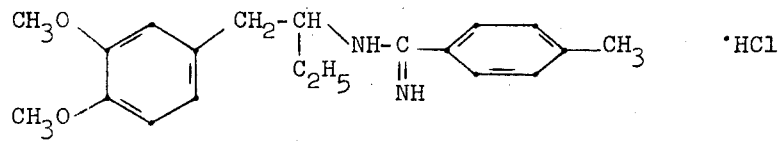

melting at 168°–173°.

EXAMPLE 17

The mixture of 2.6 g of 2-(3,4-dimethoxyphenyl)-n-propylamine, 1.7 g of 4-methylbenzamidine and 100 ml of toluene is refluxed for 48 hours and evaporated. The residue is taken up in the minimum amount of ethyl acetate, the solution acidified with hydrogen chloride in ethyl acetate, and the precipitate formed recrystallized from methanol-acetonitrile, to yield the N-[2-(3,4-dimethoxyphenyl)-n-propyl]-4-methylbenzamidine hydrochloride of the formula

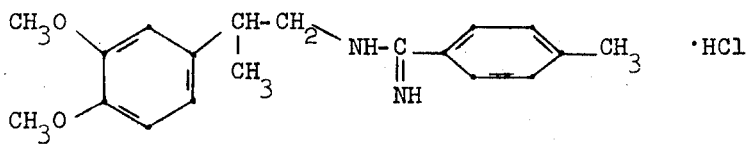

melting at 210°–212°.

The starting material is prepared as follows: To the solution of 35.4 g of 3,4-dimethoxyphenyl-acetonitrile in 100 ml of dimethylsulfoxide, the solutions of 13.7 ml of methyl iodide in 30 ml of dimethylsulfoxide and 40 g of sodium hydroxide in 40 ml of water are added dropwise at about the same rate while stirring and cooling with ice, so that the internal temperature does not exceed 30°. The mixture is stirred at room temperature for 2 hours, 250 ml of water are added and the mixture is extracted with 400 ml of benzene and 100 ml of diethyl ether. The combined extracts are washed with saturated aqueous sodium bicarbonate and sodium chloride, dried and evaporated. The residue is triturated with diethyl ether-hexane and the solution filtered. The filtrate is concentrated and the precipitate formed recrystallized from diethyl ether-ethanol, to yield the α-(3,4-dimethoxyphenyl)-propionitrile.

The solution of 25 g thereof in 200 ml of tetrahydrofuran is added slowly to the mixture of 260 ml of 1 molar borane in tetrahydrofuran and 500 ml of tetrahydrofuran while stirring. Thereupon, the mixture is refluxed for 24 hours, cooled in an ice bath and 50 ml of 4N hydrochloric acid are added dropwise. It is evaporated under reduced pressure, the residue taken up in water, the mixture made basic with aqueous potassium hydroxide and extracted with chloroform. The extract is washed with water, dried and evaporated, to yield the 2-(3,4-dimethoxyphenyl)-n-propylamine.

We claim:

1. A compound of the formula

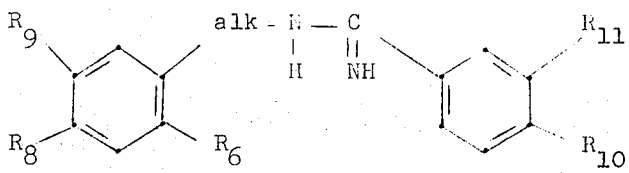

wherein alk is 1,2-ethylene, 1,2-propylene or 1,2-butylene, $R_6$ is hydrogen, methoxy, chloro, nitro or sulfamoyl, each of $R_8$ and $R_9$ is methoxy and each of $R_{10}$ and $R_{11}$ is hydrogen, methyl or chloro, or a salt thereof of a pharmaceutically acceptable acid.

2. A compound as claimed in claim 1, N-[2-(2-nitro-4,5-dimethoxyphenyl)-ethyl]-4-methyl-benzamidine or a salt thereof of a pharmaceutically acceptable acid.

3. A compound as claimed in claim 1, N-methyl-N'-[2-(3,4-dimethoxy-phenyl)-ethyl]-4-methyl-benzamidine or a salt thereof of a pharamaceutically acceptable acid.

4. A compound as claimed in claim 1, N-[1-(3,4-dimethoxyphenyl)-2-n-butyl]-4-chloro-benzamidine or a salt thereof of a pharmaceutically acceptable acid.

5. A compound as claimed in claim 1, N-[1-(3,4-dimethoxyphenyl)-2-n-butyl]-4-methyl-benzamidine or a salt thereof of a pharmaceutically acceptable acid.

6. A compound as claimed in claim 1, N-[2-(3,4-dimethoxyphenyl)-n-propyl]-4-methyl-benzamidine or a salt thereof of a pharmaceutically acceptable acid.

* * * * *